US009369825B2

(12) United States Patent
Bell (10) Patent No.: US 9,369,825 B2
(45) Date of Patent: Jun. 14, 2016

(54) SYSTEMS AND METHODS FOR TRANSMITTING DATA USING SELECTED TRANSMISSION TECHNOLOGY FROM AMONG OTHER TRANSMISSION TECHNOLOGIES

(71) Applicant: MAD CATZ INTERACTIVE, INC., San Diego, CA (US)

(72) Inventor: Simon Bell, Herefordshire (GB)

(73) Assignee: MAD CATZ INTERACTIVE, INC., San Diego, CA (US)

( * ) Notice: Subject to any disclaimer, the term of this patent is extended or adjusted under 35 U.S.C. 154(b) by 12 days.

(21) Appl. No.: 14/299,270

(22) Filed: Jun. 9, 2014

(65) Prior Publication Data

US 2014/0364063 A1 Dec. 11, 2014

Related U.S. Application Data

(60) Provisional application No. 61/833,530, filed on Jun. 11, 2013.

(51) Int. Cl.
*H04B 7/00* (2006.01)
*H04W 4/00* (2009.01)

(52) U.S. Cl.
CPC .................................... *H04W 4/008* (2013.01)

(58) Field of Classification Search
CPC ..... H04W 88/06; H04W 48/18; H04W 36/14; H04W 84/18; H04W 76/02; H04W 8/245; H04W 24/02; H04W 88/02
USPC ......... 455/435.2, 428, 41.2, 4.04, 464, 188.1, 455/418–420, 422.1, 550.1, 552.1; 709/241
See application file for complete search history.

(56) References Cited

U.S. PATENT DOCUMENTS

| | | | |
|---|---|---|---|
| 6,782,429 B1 * | 8/2004 | Kisor | 709/241 |
| 6,848,008 B1 * | 1/2005 | Sevanto et al. | 709/249 |
| 7,792,777 B2 * | 9/2010 | Selin | 706/48 |
| 9,042,338 B2 * | 5/2015 | Karls | 370/331 |
| 2002/0022453 A1 | 2/2002 | Balog | |
| 2005/0066045 A1 | 3/2005 | Johnson | |
| 2010/0239077 A1 * | 9/2010 | Michaelis et al. | 379/93.02 |
| 2011/0131631 A1 * | 6/2011 | Ihori et al. | 726/3 |
| 2012/0213098 A1 * | 8/2012 | Sun | 370/252 |
| 2013/0040573 A1 * | 2/2013 | Hillyard | 455/41.2 |
| 2013/0102251 A1 | 4/2013 | Linde | |
| 2014/0018002 A1 * | 1/2014 | Jose et al. | 455/41.2 |

(Continued)

OTHER PUBLICATIONS

Form PCT/ISA/220, PCT/US2014/041498, "Notification of Transmittal of the International Search Report and the Written Opinion of the International Searching Authority, or the Declaration", 1 page; FORM PCT/ISA/210, PCT/US2014/041498, "International Search Report", 2 pages; FORM PCT/ISA/237, PCT/US2014/041498, "Written Opinion of the International Searching Authority", 5 pages; Search History, 4 pages.

*Primary Examiner* — Nhan Le (57) ABSTRACT

This disclosure describes systems and methods for selecting from among two or more wireless transmission technologies depending on one or more factors. Aspects of this disclosure may apply to various computer systems that use Bluetooth technologies for transmitting and receiving data between two devices. In particular, aspects of this disclosure may be used in a gaming environment such that data is transmitted based on any of the shared capabilities of the devices, the type of data, the amount of the data, latency constraints associated with the data, and other considerations.

42 Claims, 4 Drawing Sheets

(56) References Cited

U.S. PATENT DOCUMENTS

| | | | |
|---|---|---|---|
| 2014/0196116 A1* | 7/2014 | Maguire | 726/4 |
| 2014/0273858 A1* | 9/2014 | Panther et al. | 455/41.2 |
| 2015/0042447 A1* | 2/2015 | Vogt et al. | 340/4.41 |
| 2015/0103816 A1* | 4/2015 | Nagara | 370/343 |
| 2015/0172423 A1* | 6/2015 | Wu et al. | |

\* cited by examiner

SYSTEMS AND METHODS FOR TRANSMITTING DATA USING SELECTED TRANSMISSION TECHNOLOGY FROM AMONG OTHER TRANSMISSION TECHNOLOGIES

CROSS REFERENCE TO RELATED APPLICATIONS

This application claims priority under 35 U.S.C. §119(e) to U.S. Provisional Patent Application Ser. No. 61/833,530, filed Jun. 11, 2013, entitled COMPUTING/GAMING PERIPHERALS WITH DUAL BLUETOOTH IMPLEMENTATIONS, the content of which is hereby incorporated by reference herein in its entirety for all purposes.

FIELD

Various embodiments relate to communication with computer and gaming peripheral systems, and more particularly, to networks, devices, methods and machine-readable media for selectively utilizing two communication platforms when transmitting or receiving data.

BACKGROUND

Networks are often formed among remote computing devices such that information may be communicated between the devices using various communication technologies. In many networks, a computing device receives information from other devices that enable a user to interact with the computing device such that the computing device controls a program based on user inputs. In gaming, for example, the computing device is often referred to as a "host" or a "console", which carries out processing and usually outputs video or other types of outputs for consumption by the user. The user often uses an input device referred to as a "peripheral" to send inputs to the console that respond to and/or prompt outputs from the console. The peripherals typically include hardware and software that expand the capabilities of the console.

The interfaces between consoles and peripherals are highly variable and come in many styles and features such that various peripherals are incompatible with each other in addition to incompatibility among peripherals and consoles. In some cases, interfacing technology used between a peripheral and a console or another peripheral may not be available for other consoles and peripherals.

To complicate matters more, different programs or games exploit the same interface technology in different ways, or even require different interface technologies to function as intended.

In some cases, advancements in interface technologies render legacy technologies (and the peripherals or consoles that rely on them) unusable, or at least less desirable.

Accordingly, more versatile approaches for using computer and gaming peripheral interfaces are needed for multi-system compatibility and to keep up with technological advances while maintaining compatibility with legacy systems.

SUMMARY OF THE INVENTION

Certain embodiments of this disclosure relate generally to networks, devices, methods and machine-readable media for selecting a wireless transmission technology over which data is transferred between two devices. Such networks, devices, methods and machine-readable media may select one of a first wireless transmission technology and a second wireless transmission technology to exchange data between a first device and a second device. The selecting may be based on one or more of: whether the first wireless transmission technology is supported by both of the first and second devices, a type of the data, a latency parameter associated with the data, a data rate parameter associated with the data, and an amount of the data. The networks, devices, methods and machine-readable media further cause the data to be exchanged between the first device and the second device using the selected one of the first wireless transmission technology and the second wireless transmission technology.

DETAILED DESCRIPTION

Various aspects of this disclosure relates to a device that utilize two or more wireless transmission technologies for exchanging data between that device and another device.

Figure 1A:
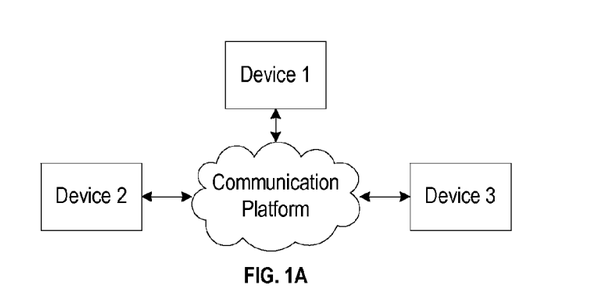
FIG. 1A depicts a network system within which aspects of the disclosure may operate.

FIG. 1A depicts a network system within which aspects of the disclosure may operate. As shown, three devices exchange data via a communication platform. The communication platform utilizes any known or later-developed communication technologies to facilitate communication among the various other platforms. Examples of communication technologies include any wired and/or wireless communication pathways, protocols and infrastructure (e.g., access points, gateways, and the like).

Figure 1B:
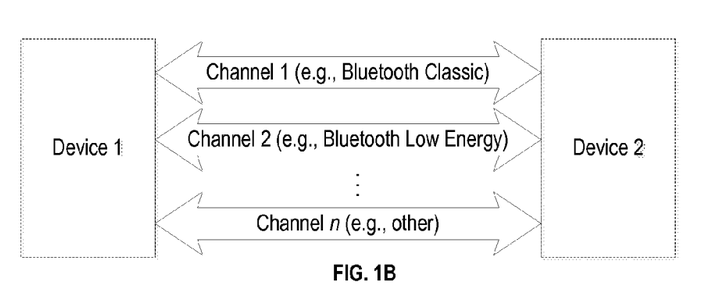
FIG. 1B depicts one implementation for exchanging data between two devices.

FIG. 1B depicts one implementation for exchanging data between two devices. As shown, two devices exchange information via up to n communication channels, including a Bluetooth Classic ("Classic") channel and a Bluetooth Low Energy (BLE) channel.

Description below focuses on selectively utilizing one or both of two Bluetooth wireless transmission technologies (e.g., BLE and Classic/pre-BLE); however, other wireless transmission technologies known or later developed in the art may be used along with or in place of the Bluetooth technologies.

Figure 2:
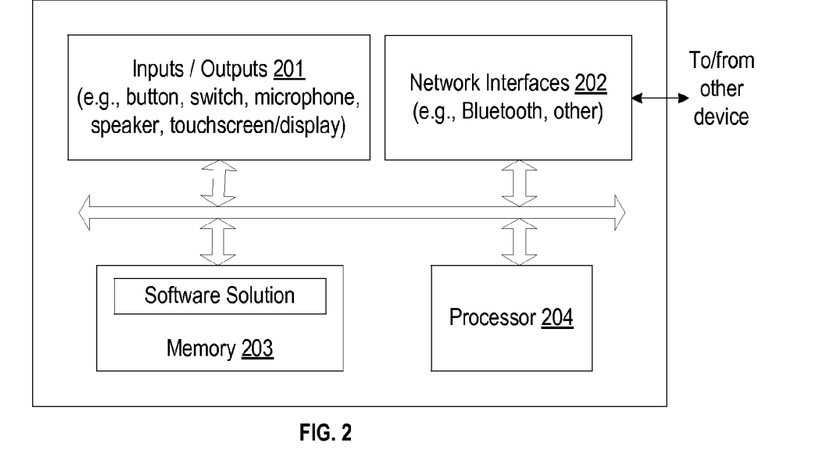
FIG. 2 depicts a device system within which aspects of the disclosure may operate.

Description below also focuses on gaming peripherals; however, any type of computing device and/or peripheral may be used in association with the methods described herein. Such peripherals may include various components, including some or all of the components shown in FIG. 2. As shown, FIG. 2 depicts a device with inputs and outputs 201 (e.g., buttons, switches, microphones, speakers, touchscreens, displays, other means) for receiving inputs from a user and for providing outputs to that user. The device further includes one or more network interfaces 202 (e.g., an antenna, a USB port, or other means) for receiving and sending data from and two other devices. The device also includes a memory 203 for storing a software solution such that a processor 204 executes instructions embodied in the software solution. Various software solutions are contemplated that carry out the methods described herein.

Various embodiments of this disclosure relate to use of a first wireless communication technology over a second wireless communication technology depending on various factors, such as a device's ability to use the first wireless communication technology, the type of data that needs to be transferred, the amount of data that needs to be transferred, and a tolerated amount of delay until the data must be received and/or processed at the remote device, among other factors.

In one embodiment, for example, a gaming peripheral first attempts to exchange data with another device using Bluetooth Low Energy (BLE). If BLE is not available, or if BLE is available but cannot support certain transmission requirements, the peripheral then uses Bluetooth Classic ("Classic"), which is often referred to as standard Bluetooth. Of course, the opposite may be true where a first attempt is made using Classic, and then BLE is used only when Classic is not available or incapable of supporting transmission requirements.

In another embodiment, a gaming peripheral simultaneously exchanges data on BLE and Classic. This combination enables certain types of data (e.g., low latency data) to be exchanged using BLE, while other types of data (e.g., audio, video and haptic data) are exchanged using Classic. Doing so enables quicker transmission of important or time-critical data.

Certain embodiments exchange information between two devices (e.g., a peripheral and a console), where both devices have the capability to exchange information using the two wireless transmission technologies (e.g., a dual-mode Bluetooth platform on each device), where only one device has the capability to exchange information using the two wireless transmission technologies, or where neither device has the capability to exchange information using both of the two wireless transmission technologies.

Where a peripheral has the capability to exchange information using the two wireless transmission technologies (e.g., Classic and BLE), that peripheral chooses the most appropriate wireless link based on the other device with which the peripheral is communicating (e.g., a console, another peripheral). If the other device can use both wireless transmission technologies, then the peripheral can seamlessly transmit data using a preferred wireless transmission technology. When the preferred wireless transmission technology is relatively new, a peripheral (e.g., a game controller, mouse, keyboard, joystick, wheel, flight stick, fight stick, fight pad, graphical instrument panel, a touch screen, or other peripheral) can interface with a newer console that supports the newer wireless transmission technology, and the peripheral may also interface with a legacy console that does not support the newer wireless transmission technology. Similarly, the peripheral may use one wireless transmission technology to improve interaction with a program or game that performs better when that wireless transmission technology is used, and the peripheral may later interface with a legacy program or game that that does not support the newer wireless transmission technology.

The peripheral may also transmit the same type of information using the different wireless transmission technologies depending on which technologies are available. For example, where the peripheral is a Human Interface Device (HID), Classic's HID profile may allow and define communication of data. Similarly, BLE's HID over GATT Profile (HOGP) may allow and define communication of the data.

Additional embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Methodologies

Figure 4:
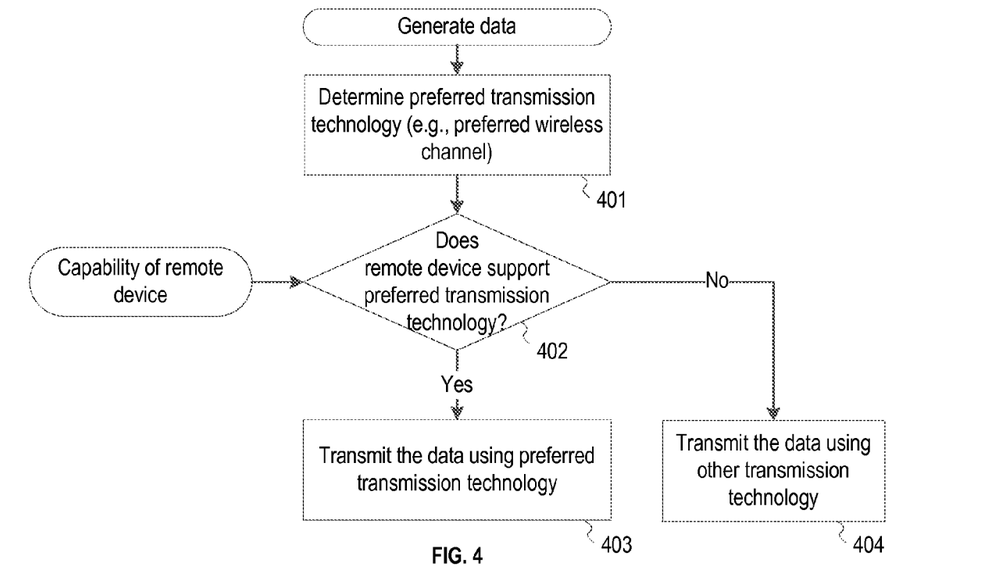
FIG. 4 illustrates a process for transmitting data using one of two wireless transmission technologies based on capability of a device.

FIG. 4 illustrates a process for transmitting data using one of two wireless transmission technologies based on capability of another device. According to FIG. 4, a preferred transmission technology is determined (401). Once the preferred transmission channel is determined, a capability of a remote device is consulted to determine whether that remote device supports data transmissions via the preferred transmission technology (402). If the remote device supports data transmissions via the preferred transmission technology, the data is transmitted using the preferred technology (403). Otherwise, when the remote device does not support data transmissions via the preferred transmission technology, the data is transmitted using technology other than the preferred technology (404).

Figure 5:
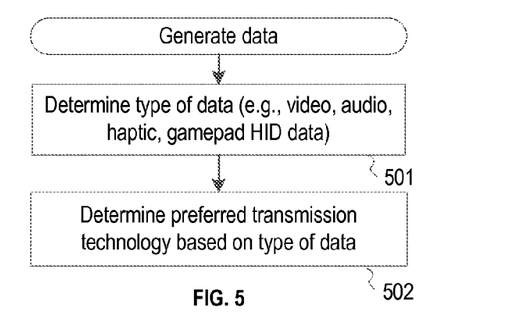
FIG. 5 illustrates a process for transmitting data using one of two wireless transmission technologies based on the type of data.

FIG. 5 illustrates a process for transmitting data using one of two wireless transmission technologies based on the type of data. According to FIG. 5, a type of data to be transmitted is determined (501), and a preferred transmission technology is determined based on the type of data (502). The type of data may include, for example, higher bandwidth data like voice content, audio content, and prompts and commands sent via HFP1.6 using Classic Bluetooth. Other types of data may include minimal event driven data (e.g., digital and analog button/axes reports), gamepad HID data, and media keys sent via BLE.

Figure 6:
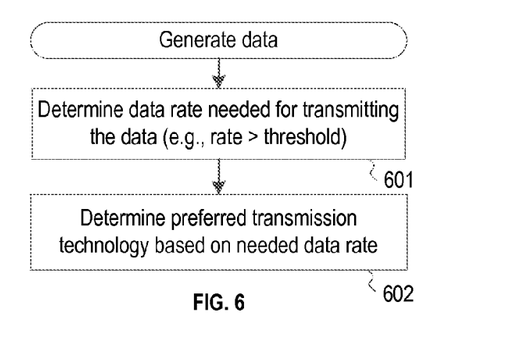
FIG. 6 illustrates a process for transmitting data using one of two wireless transmission technologies based on a desired or needed data rate associated with data to be transmitted.

FIG. 6 illustrates a process for transmitting data using one of two wireless transmission technologies based on a desired or needed data rate associated with data to be transmitted. According to FIG. 6, a data rate associated with data to be transmitted is determined (601), and a preferred transmission technology is determined based on the data rate (602). Determination of the data rate may be based on a requirement set forth by a program or game, or by other ways known in the art. In one embodiment, one transmission technology is selected over another transmission technology when the data rate exceeds a threshold data rate (e.g., a maximum data rate of the other transmission technology, a minimum tolerated data rate for the selected transmission technology).

Figure 7:
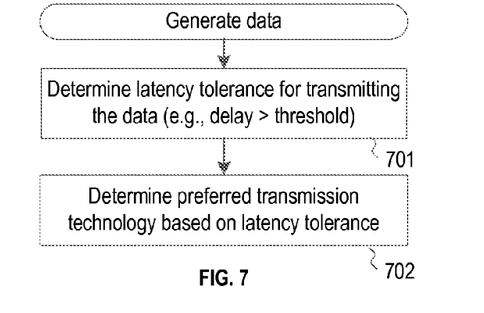
FIG. 7 illustrates a process for transmitting data using one of two wireless transmission technologies based on a latency tolerance associated with data to be transmitted.

FIG. 7 illustrates a process for transmitting data using one of two wireless transmission technologies based on a latency tolerance associated with data to be transmitted. According to FIG. 7, a required or tolerated latency associated with data to be transmitted is determined (701), and a preferred transmission technology is determined based on the tolerated latency (702). Determination of the tolerated latency may be based on a requirement set forth by a console/other peripheral, program or game in relation to that data (e.g., where a tolerated amount of latency is provided by the console/other peripheral, program or game) or in relation to other data (e.g., that is of higher priority than the data), or by other ways known in the art. In one embodiment, one transmission technology is selected over another transmission technology when the tolerated latency exceeds a threshold latency value (e.g., a maximum latency possible with the other transmission technology, a minimum latency possible with the selected transmission technology).

Figure 8:
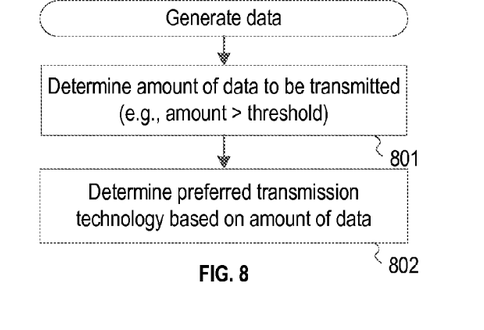
FIG. 8 illustrates a process for transmitting data using one of two wireless transmission technologies based on an amount of data to be transmitted.

FIG. 8 illustrates a process for transmitting data using one of two wireless transmission technologies based on an amount of data to be transmitted. According to FIG. 8, an amount of data to be transmitted is determined (801), and a preferred transmission technology is determined based on the amount of data (802). In one embodiment, one transmission technology is selected over another transmission technology when the amount of data exceeds a threshold amount of data (e.g., a maximum amount of data that can be carried by the other transmission technology, a minimum amount of data that can be carried by the selected transmission technology).

Figure 9:
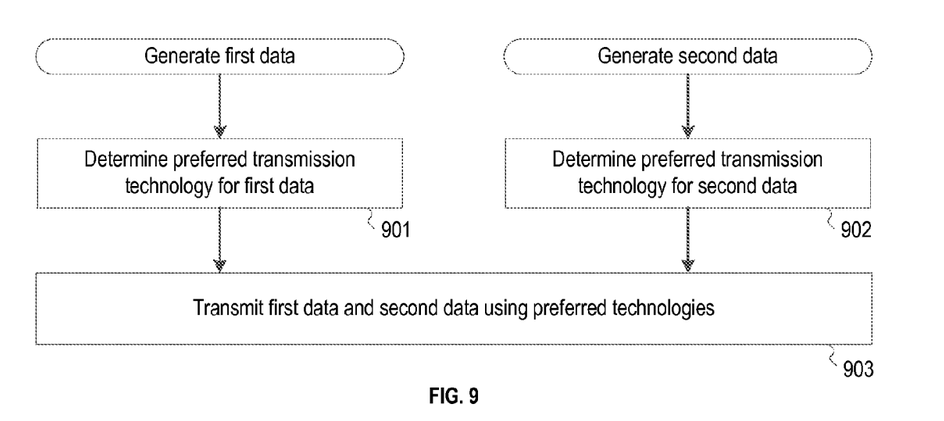
FIG. 9 illustrates a process for concurrent transmission of two sets of data using different ones of two or more wireless transmission technologies.

FIG. 9 illustrates a process for concurrent transmission of two sets of data using different ones of two or more wireless transmission technologies. Preferred transmission technologies are determined for each of the sets of data (901, 902), and the sets of data are transmitted using the their preferred transmission technology (903).

Aspects Related to One or More Bluetooth Implementations

A dual-mode Bluetooth device may include an integrated circuit that includes both a Classic radio feature and a BLE radio feature. In some embodiments, each radio feature operates separately, but not at the same time when they share an antenna. If an antenna is shared, data transmitted using Classic and data transmitted using BLE may be interleaved, or transmitted using a different technique. In other embodiments, like when different radio platforms are available, Classic transmission occurs in parallel with BLE transmission.

Determining what to transmit, when to transmit it, and what technology to transmit it with may be made by a processor (e.g., using a Bluetooth selection procedure).

In certain embodiments, BLE technology is used for episodic or periodic transfer of small amounts of data, and Classic is used for streaming data since Classic can achieve substantially greater throughput than BLE. In other embodiments, Classic is used to transmit data to a remote device when the range to that remote device exceeds the range of BLE or a minimum range.

Figure 1C:
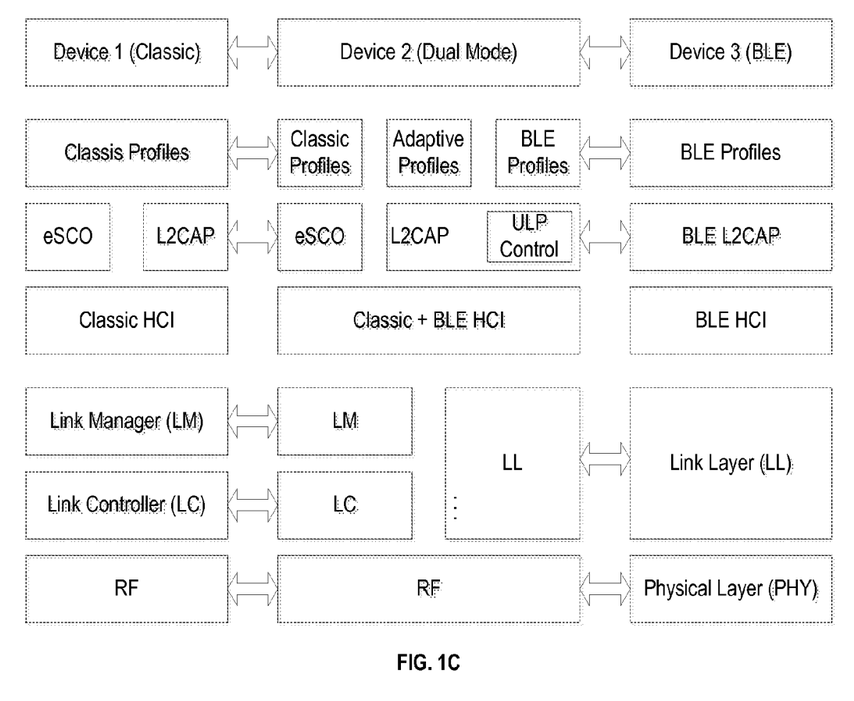
FIG. 1C depicts protocol stacks corresponding to three devices, each with different Bluetooth capabilities.

FIG. 1C depicts one implementation for exchanging data between three devices, each with different capabilities. Classic, Dual-mode and BLE stacks are shown from left to right.

Aspects Related to a Gamepad Controller

Figure 3A:
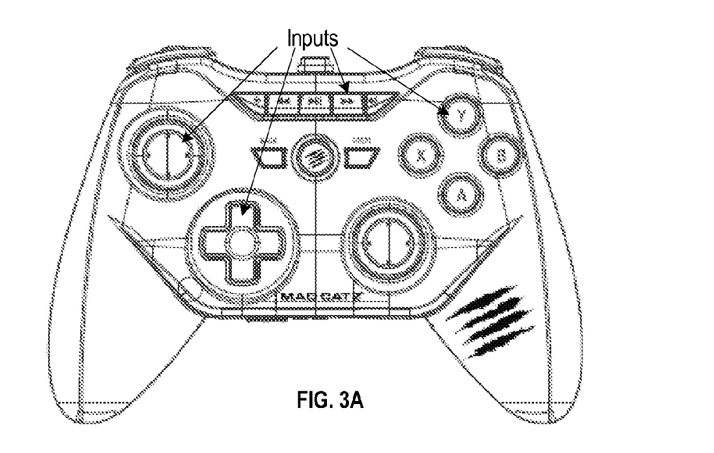
FIG. 3A illustrates a top view perspective of a user interface device.
Figure 3B:
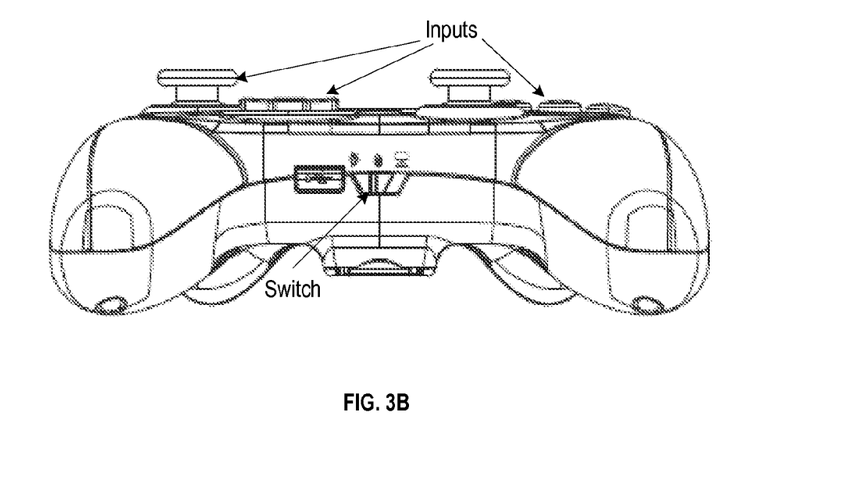
FIG. 3B illustrates a side view perspective of a user interface device.

FIG. 3A and FIG. 3B illustrate a gamepad controller which has the ability to control media directly with dedicated Play/Pause/Next Track/Previous Track buttons. The illustrative controller is shown to have a mode selection switch (see FIG. 3B), which may be available via a physical hardware switch, and/or implemented in software (e.g., activated by voice recognition, shaking of the gamepad, or other means). The switch permits the controller to change how it reports and operates. For example, the switch may set the controller as a mouse (e.g., for moving a cursor and making selections on a display), a gamepad (e.g., for interacting with a game like controlling a player in a game), or as a user device that is connected to an auxiliary device like a smart phone or other computing device (e.g., that connects to the controller). The switch may also switch between transmission technologies.

The controller may be designed to extend the core gaming experience to supporting mobile computing devices (e.g., smart phones) by having the ability to use different transmission technologies that are supported or even preferred by those mobile computing devices.

The illustrative controller selects one of two or more wireless transmission technologies depending on various factors described elsewhere herein, which offers mobile game developers and publishers standardization not found in association with other controllers and other peripherals. The controller also provides for ease of implementation and scalability by enabling controller and console-like accessory functionality in mobile games. The illustrative controller is game and hardware agnostic (i.e., interoperable among various systems), universally compatibility, and features simplified setup, longer battery life (e.g., due to use of BLE for some data transmissions).

The illustrative controller is compatible with a wide variety of devices including Windows PC, Mac, and mobile and smart devices. It features both Bluetooth Classic and Bluetooth Smart (4.0) technologies, which provides the ideal combination of compatibly and future proof connectivity to any computing device. When used with compatible devices, Bluetooth Smart provides ultra-low latency, interference free gaming and exceptional battery life.

In some embodiments, the controller includes three Human Interface Device (HID) modes ensuring mobile and desktop platforms are supported. An Android Mode implements controls based on the NVIDIA® Tegra® standard. A Mouse Mode implements keyboard and mouse controls for device navigation and browsing, which is ideal for living room computing and PC Mode implements standard PC pad controls.

Firmware update capability provides a future proof design and included travel clip allows gamers to attach their Apple, Android or other device for gaming on the go. Desktop and mobile software may be downloaded as well, allowing a user to adjust control stick settings and view product information. Thus, the controller can be fully programmed on desktop computers and Windows PC users will be able to access XInput mode for supported games.

In various embodiments, the gamepad controller of FIG. 3A and FIG. 3B includes the components of FIG. 2, and performs the methodologies disclosed herein.

Other Aspects Related to Systems & Methods

Functionality and operation disclosed herein may be embodied as one or more methods implemented, in whole or in part, by machine(s)—e.g., processor(s)—at one or more locations. Non-transitory machine-readable media embodying program instructions adapted to be executed to implement the method(s) are also contemplated. Execution of the program instructions by one or more processors cause the processors to carry out the method(s).

By way of example, not by way of limitation, method(s) may comprise: selecting one of a first wireless transmission technology and a second wireless transmission technology to exchange data between a first device and a second device, wherein the selecting is based on one or more of: whether the first wireless transmission technology is supported by both of the first and second devices, a type of the data, a latency parameter associated with the data, a data rate parameter associated with the data, and an amount of the data; and causing the data to be exchanged between the first device and the second device using the selected one of the first wireless transmission technology and the second wireless transmission technology.

Method(s) may further or alternatively comprise: determining whether the first wireless transmission technology is supported by each of the first and second devices; selecting the first wireless transmission technology over the second wireless transmission technology to exchange the data between the first device and the second device when the first wireless transmission technology is supported by both of the first and second devices; and using the second wireless transmission technology to exchange the data between the first device and the second device only after determining that the first wireless transmission technology is not supported by at least one of the first and second devices.

In accordance with some aspects, the first wireless transmission technology is Bluetooth low energy (BLE) technology, and wherein the second wireless transmission technology is Classic Bluetooth technology.

Method(s) may further or alternatively comprise: identifying the type of the data, wherein the selecting is based on the type of the data.

Method(s) may further or alternatively comprise: determining whether the type of the data is included among a first set of data types; selecting the first wireless transmission technology over the second wireless transmission technology to exchange the data between the first device and the second device when the type of the data is included among the first set of data types; and selecting the second wireless transmission technology over the first wireless transmission technology to exchange the data between the first device and the second device when the type of the data is not included among the first set of data types.

In accordance with some aspects, the first set of data types include video, audio, and haptic data.

In accordance with some aspects, the first wireless transmission technology is Classic Bluetooth technology, and wherein the second wireless transmission technology is Bluetooth low energy (BLE) technology.

Method(s) may further or alternatively comprise: identifying the latency parameter associated with the data, wherein the selecting is based on the latency parameter associated with the data.

Method(s) may further or alternatively comprise: determining whether the latency parameter associated with the data exceeds a threshold latency condition; selecting the first wireless transmission technology over the second wireless transmission technology to exchange the data between the first device and the second device when the latency parameter associated with the data does not exceed the threshold latency condition; and selecting the second wireless transmission technology over the first wireless transmission technology to exchange the data between the first device and the second device when the latency parameter associated with the data exceeds the threshold latency condition.

In accordance with some aspects, the first wireless transmission technology is Classic Bluetooth technology, and wherein the second wireless transmission technology is Bluetooth low energy (BLE) technology.

Method(s) may further or alternatively comprise: identifying the data rate parameter associated with the data, wherein the selecting is based on the data rate parameter associated with the data.

Method(s) may further or alternatively comprise: determining whether the data rate parameter associated with the data exceeds a threshold data rate condition; selecting the first wireless transmission technology over the second wireless transmission technology to exchange the data between the first device and the second device when the data rate parameter associated with the data exceeds the threshold data rate condition; and selecting the second wireless transmission technology over the first wireless transmission technology to exchange the data between the first device and the second device when the data rate parameter associated with the data does not exceed the threshold data rate condition.

In accordance with some aspects, the first wireless transmission technology is Classic Bluetooth technology, and wherein the second wireless transmission technology is Bluetooth low energy (BLE) technology.

Method(s) may further or alternatively comprise: identifying the amount of the data, wherein the selecting is based on the amount of the data.

Method(s) may further or alternatively comprise: determining whether the amount of the data exceeds a threshold amount of data; selecting the first wireless transmission technology over the second wireless transmission technology to exchange the data between the first device and the second device when the amount of the data exceeds the threshold amount of data; and selecting the second wireless transmission technology over the first wireless transmission technology to exchange the data between the first device and the second device when the amount of the data does not exceed the threshold amount of data.

In accordance with some aspects, the first wireless transmission technology is Classic Bluetooth technology, and wherein the second wireless transmission technology is Bluetooth low energy (BLE) technology.

In accordance with some aspects, the first wireless transmission technology is selected to exchange the data between the first device and the second device, and wherein the second wireless transmission technology is selected to exchange additional data between the first device and the second device.

In accordance with some aspects, the second wireless transmission technology is selected to exchange the additional data based on one or more of a type of the additional data, a latency parameter associated with the additional data, a data rate parameter associated with the additional data, and an amount of the additional data.

In accordance with some aspects, differences between the type of the data and the type of the additional data are used to select the first wireless transmission technology to exchange the data between the first device and the second device, and also used to select the second wireless transmission technology to exchange the additional data between the first device and the second device.

Method(s) may further or alternatively comprise: causing the data to be transmitted using the first wireless transmission technology at the same time when the additional data is transmitted using the second wireless transmission technology.

Method(s) may further or alternatively comprise: determining whether a hardware switch of the first device is in a first position or a second position; selecting the first wireless transmission technology when the hardware switch of the first device is in the first position; and selecting the second wireless transmission technology when the hardware switch of the first device is in the second position.

In accordance with some aspects, the first wireless transmission technology is Classic Bluetooth technology, and wherein the second wireless transmission technology is Bluetooth low energy (BLE) technology.

Any portion of the functionality embodied in the method(s) above may be combined with any other portion of that functionality.

Systems that carry out functionality (e.g., embodied as methods) may include one or more devices, including transmitter(s) from which position information is sent, receiver(s) at which position information is received, processor(s)/ server(s) used to compute a position of a receiver and carry out other functionality, input/output (I/O) device(s), data source(s) and/or other device(s). Outputs from a first device or group of devices may be received and used by another device during performance of methods. Accordingly, an output from one device may cause another device to perform a method even where the two devices are no co-located (e.g., a receiver in a network of transmitters and a server in another country). Additionally, one or more computers may programmed to carry out various methods, and instructions stored on one or more machine-readable media may be executed by a processor to perform various methods.

The illustrative systems, methods, logical features, blocks, modules, components, circuits, and algorithm steps described herein may be implemented, performed, or otherwise controlled by suitable hardware known or later developed in the art, or by firmware or software executed by processor(s), or any combination of hardware, software and firmware.

Systems may include one or more devices or means that implement the functionality (e.g., embodied as methods) described herein. For example, such devices or means may include processor(s) that, when executing instructions, perform a portion or all of any method disclosed herein. Such instructions can be embodied in software, firmware and/or hardware. A processor (also referred to as a "processing device") may perform or otherwise carry out any of the operational steps, processing steps, computational steps, method steps, or other functionality disclosed herein, including analysis, manipulation, conversion or creation of data, or other operations on data. A processor may include, or be included within, a general purpose processor, a digital signal processor (DSP), an integrated circuit, a server, other programmable logic device, or any combination thereof. A processor may be a conventional processor, microprocessor, controller, microcontroller, or state machine. A processor can also refer to a chip or part of a chip (e.g., semiconductor chip). The term "processor" may refer to one, two or more processors of the same or different types. It is noted that a computer, computing device and user device, and the like, may refer to devices that include a processor, or may be equivalent to the processor itself.

"Memory" may be accessible by a machine, such that the machine can read information from and/or write information to the memory. It is noted that a "machine" may include a computer, a processor, a controller, or other suitable device as known or later developed in the art. Memory may be integral with or separate from the machine. Instructions may reside in such memory (e.g., RAM, flash, ROM, EPROM, EEPROM, registers, disk storage), or any other form of storage medium. Memory may include a non-transitory machine-readable medium having machine-readable program code (e.g., instructions) embodied therein that is adapted to be executed to implement any number of the various methods, or variations of such methods, disclosed herein. Machine-readable media may be any available storage media, including non-volatile media (e.g., optical, magnetic, semiconductor). Machine-readable media may be any available storage media, including removable, non-removable, volatile, non-volatile media. Examples of machine-readable media include an electric circuit, a semiconductor storage media (e.g., a semiconductor memory device), a ROM, a flash memory, an erasable ROM (EROM), a floppy diskette or other magnetic storage, a CD-ROM/DVD or other optical storage, a hard disk, or any other medium which can be used to store the desired information and which can be accessed. Carrier waves may be used to transfer data and instructions through electronic, optical, air, electromagnetic, RF, or other signaling media over a network using network transfer protocols. Instructions embodied in software can be downloaded to reside on and operated from different platforms used by known operating systems. Instructions embodied in firmware can be contained in an integrated circuit or other suitable device Functionality (e.g., methods) disclosed herein may be programmed into any of a variety of circuitry that is suitable for such purpose as understood by one of skill in the art. For example, functionality may be embodied in processors having software-based circuit emulation, discrete logic, custom devices, neural logic, quantum devices, PLDs, FPGA, PAL, ASIC, MOSFET, CMOS, ECL, polymer technologies, mixed analog and digital, and hybrids thereof. Data, instructions, commands, information, signals, bits, symbols, and chips disclosed herein may be represented by voltages, currents, electromagnetic waves, magnetic fields or particles, optical fields or particles, or any combination thereof. Computing networks may be used to carry out functionality and may include hardware components (servers, monitors, I/O, network connection). Application programs may carry out aspects by receiving, converting, processing, storing, retrieving, transferring and/or exporting data, which may be stored in a hierarchical, network, relational, non-relational, object-oriented, or other data source.

Transmission of information may be carried out using technologies, protocols, procedures and the like that are known or later-developed by one of skill in the art. For example, information may be represented by data, and that data may be transmitted over any communication pathway using any protocol, and then stored by any data source. A data source which is depicted as a single storage device may be realized by multiple (e.g., distributed) storage devices. A data source may include one or more types of data sources, including hierarchical, network, relational, non-relational, object-oriented, or another type of data source. As used herein, machine-readable media includes all forms of machine-readable medium except, to the extent that such media is deemed to be non-statutory (e.g., transitory propagating signals).

Features in system and apparatus figures that are illustrated as rectangles may refer to hardware, firmware or software. It is noted that lines linking two such features may be illustrative of data transfer between those features. Such transfer may occur directly between those features or through intermediate features even if not illustrated. Where no line connects two features, transfer of data between those features is contemplated unless otherwise stated. Accordingly, the lines are provide to illustrate certain aspects, but should not be interpreted as limiting. The words "comprise," "comprising," "include," "including" and the like are to be construed in an inclusive sense (i.e., not limited to) as opposed to an exclusive sense (i.e., consisting only of). Words using the singular or plural number also include the plural or singular number respectively. The words "or" or "and" cover both any of the items and all of the items in a list. "Some" and "any" and "at least one" refers to one or more. The term "device" may comprise one or more components (e.g., a processor, a memory, a receiver, a screen, and others). The disclosure is not intended to be limited to the aspects shown herein but is to be accorded the widest scope understood by a skilled artisan, including equivalent systems and methods.

The invention claimed is:

1. A method for selecting a wireless transmission technology over which data is transferred between two devices, the method comprising:
    selecting one of a first wireless transmission technology or a second wireless transmission technology to exchange data between a first device and a second device,
    wherein the selecting is based on one or more of: whether the first wireless transmission technology is supported by both of the first and second devices, a type of the data, a latency parameter associated with the data, a data rate parameter associated with the data, or an amount of the data;
    causing the data to be exchanged between the first device and the second device using the selected one of the first wireless transmission technology or the second wireless transmission technology;
    determining whether the first wireless transmission technology is supported by each of the first and second devices;
    selecting the first wireless transmission technology over the second wireless transmission technology to exchange the data between the first device and the second device when the first wireless transmission technology is supported by both of the first and second devices; and
    using the second wireless transmission technology to exchange the data between the first device and the second device only after determining that the first wireless transmission technology is not supported by at least one of the first and second devices.

2. The method of claim 1, wherein the first wireless transmission technology is Bluetooth low energy (BLE) technology, and wherein the second wireless transmission technology is Classic Bluetooth technology.

3. A method for selecting a wireless transmission technology over which data is transferred between two devices, the method comprising:
    selecting one of a first wireless transmission technology or a second wireless transmission technology to exchange data between a first device and a second device,
    wherein the selecting is based on one or more of: whether the first wireless transmission technology is supported by both of the first and second devices, a type of the data, a latency parameter associated with the data, a data rate parameter associated with the data, or an amount of the data;
    causing the data to be exchanged between the first device and the second device using the selected one of the first wireless transmission technology or the second wireless transmission technology;
    identifying the type of the data, wherein the selecting is based on the type of the data;
    determining whether the type of the data is included among a first set of data types;
    selecting the first wireless transmission technology over the second wireless transmission technology to exchange the data between the first device and the second device when the type of the data is included among the first set of data types; and
    selecting the second wireless transmission technology over the first wireless transmission technology to exchange the data between the first device and the second device when the type of the data is not included among the first set of data types.

4. The method of claim 3, wherein the first set of data types include video, audio, and haptic data, and wherein the first wireless transmission technology is Classic Bluetooth technology, and wherein the second wireless transmission technology is Bluetooth low energy (BLE) technology.

5. A method for selecting a wireless transmission technology over which data is transferred between two devices, the method comprising:
    selecting one of a first wireless transmission technology or a second wireless transmission technology to exchange data between a first device and a second device,
    wherein the selecting is based on one or more of: whether the first wireless transmission technology is supported by both of the first and second devices, a type of the data, a latency parameter associated with the data, a data rate parameter associated with the data, or an amount of the data;
    causing the data to be exchanged between the first device and the second device using the selected one of the first wireless transmission technology or the second wireless transmission technology;
    identifying the latency parameter associated with the data, wherein the selecting is based on the latency parameter associated with the data;
    determining whether the latency parameter associated with the data exceeds a threshold latency condition;
    selecting the first wireless transmission technology over the second wireless transmission technology to exchange the data between the first device and the second device when the latency parameter associated with the data does not exceed the threshold latency condition; and
    selecting the second wireless transmission technology over the first wireless transmission technology to exchange the data between the first device and the second device when the latency parameter associated with the data exceeds the threshold latency condition.

6. The method of claim 5, wherein the first wireless transmission technology is Classic Bluetooth technology, and wherein the second wireless transmission technology is Bluetooth low energy (BLE) technology.

7. A method for selecting a wireless transmission technology over which data is transferred between two devices, the method comprising:
    selecting one of a first wireless transmission technology or a second wireless transmission technology to exchange data between a first device and a second device,
    wherein the selecting is based on one or more of: whether the first wireless transmission technology is supported by both of the first and second devices, a type of the data, a latency parameter associated with the data, a data rate parameter associated with the data, or an amount of the data;
    causing the data to be exchanged between the first device and the second device using the selected one of the first wireless transmission technology or the second wireless transmission technology;
    identifying the data rate parameter associated with the data, wherein the selecting is based on the data rate parameter associated with the data;

determining whether the data rate parameter associated with the data exceeds a threshold data rate condition;
selecting the first wireless transmission technology over the second wireless transmission technology to exchange the data between the first device and the second device when the data rate parameter associated with the data exceeds the threshold data rate condition; and
selecting the second wireless transmission technology over the first wireless transmission technology to exchange the data between the first device and the second device when the data rate parameter associated with the data does not exceed the threshold data rate condition.

8. The method of claim 7, wherein the first wireless transmission technology is Classic Bluetooth technology, and wherein the second wireless transmission technology is Bluetooth low energy (BLE) technology.

9. A method for selecting a wireless transmission technology over which data is transferred between two devices, the method comprising:
selecting one of a first wireless transmission technology or a second wireless transmission technology to exchange data between a first device and a second device,
wherein the selecting is based on one or more of: whether the first wireless transmission technology is supported by both of the first and second devices, a type of the data, a latency parameter associated with the data, a data rate parameter associated with the data, or an amount of the data;
causing the data to be exchanged between the first device and the second device using the selected one of the first wireless transmission technology or the second wireless transmission technology;
identifying the amount of the data, wherein the selecting is based on the amount of the data;
determining whether the amount of the data exceeds a threshold amount of data;
selecting the first wireless transmission technology over the second wireless transmission technology to exchange the data between the first device and the second device when the amount of the data exceeds the threshold amount of data; and
selecting the second wireless transmission technology over the first wireless transmission technology to exchange the data between the first device and the second device when the amount of the data does not exceed the threshold amount of data.

10. The method of claim 9, wherein the first wireless transmission technology is Classic Bluetooth technology, and wherein the second wireless transmission technology is Bluetooth low energy (BLE) technology.

11. A method for selecting a wireless transmission technology over which data is transferred between two devices, the method comprising:
selecting one of a first wireless transmission technology or a second wireless transmission technology to exchange data between a first device and a second device,
wherein the selecting is based on one or more of: whether the first wireless transmission technology is supported by both of the first and second devices, a type of the data, a latency parameter associated with the data, a data rate parameter associated with the data, or an amount of the data; and
causing the data to be exchanged between the first device and the second device using the selected one of the first wireless transmission technology or the second wireless transmission technology,
wherein the first wireless transmission technology is selected to exchange the data between the first device and the second device, and wherein the second wireless transmission technology is selected to exchange additional data between the first device and the second device.

12. The method of claim 11, wherein the second wireless transmission technology is selected to exchange the additional data based on one or more of a type of the additional data, a latency parameter associated with the additional data, a data rate parameter associated with the additional data, or an amount of the additional data.

13. The method of claim 11, the method comprising:
causing the data to be transmitted using the first wireless transmission technology at the same time when the additional data is transmitted using the second wireless transmission technology.

14. A method for selecting a wireless transmission technology over which data is transferred between two devices, the method comprising:
selecting one of a first wireless transmission technology or a second wireless transmission technology to exchange data between a first device and a second device,
wherein the selecting is based on one or more of: whether the first wireless transmission technology is supported by both of the first and second devices, a type of the data, a latency parameter associated with the data, a data rate parameter associated with the data, or an amount of the data;
causing the data to be exchanged between the first device and the second device using the selected one of the first wireless transmission technology or the second wireless transmission technology;
determining whether a hardware switch of the first device is in a first position or a second position;
selecting the first wireless transmission technology when the hardware switch of the first device is in the first position; and
selecting the second wireless transmission technology when the hardware switch of the first device is in the second position,
wherein the first wireless transmission technology is Classic Bluetooth technology, and wherein the second wireless transmission technology is Bluetooth low energy (BLE) technology.

15. Non-transitory machine-readable media embodying program instructions adapted to be executed to implement a method for selecting a wireless transmission technology over which data is transferred between two devices, the method comprising:
selecting one of a first wireless transmission technology or a second wireless transmission technology to exchange data between a first device and a second device,
wherein the selecting is based on one or more of: whether the first wireless transmission technology is supported by both of the first and second devices, a type of the data, a latency parameter associated with the data, a data rate parameter associated with the data, or an amount of the data;
causing the data to be exchanged between the first device and the second device using the selected one of the first wireless transmission technology or the second wireless transmission technology;
determining whether the first wireless transmission technology is supported by each of the first and second devices;

selecting the first wireless transmission technology over the second wireless transmission technology to exchange the data between the first device and the second device when the first wireless transmission technology is supported by both of the first and second devices; and using the second wireless transmission technology to exchange the data between the first device and the second device only after determining that the first wireless transmission technology is not supported by at least one of the first and second devices.

16. The non-transitory machine-readable media of claim 15, wherein the first wireless transmission technology is Bluetooth low energy (BLE) technology, and wherein the second wireless transmission technology is Classic Bluetooth technology.

17. Non-transitory machine-readable media embodying program instructions adapted to be executed to implement a method for selecting a wireless transmission technology over which data is transferred between two devices, the method comprising:
selecting one of a first wireless transmission technology or a second wireless transmission technology to exchange data between a first device and a second device,
wherein the selecting is based on one or more of: whether the first wireless transmission technology is supported by both of the first and second devices, a type of the data, a latency parameter associated with the data, a data rate parameter associated with the data, or an amount of the data;
causing the data to be exchanged between the first device and the second device using the selected one of the first wireless transmission technology or the second wireless transmission technology;
identifying the type of the data, wherein the selecting is based on the type of the data;
determining whether the type of the data is included among a first set of data types;
selecting the first wireless transmission technology over the second wireless transmission technology to exchange the data between the first device and the second device when the type of the data is included among the first set of data types; and
selecting the second wireless transmission technology over the first wireless transmission technology to exchange the data between the first device and the second device when the type of the data is not included among the first set of data types.

18. The non-transitory machine-readable media of claim 17, wherein the first set of data types include video, audio, and haptic data, and wherein the first wireless transmission technology is Classic Bluetooth technology, and wherein the second wireless transmission technology is Bluetooth low energy (BLE) technology.

19. Non-transitory machine-readable media embodying program instructions adapted to be executed to implement a method for selecting a wireless transmission technology over which data is transferred between two devices, the method comprising:
selecting one of a first wireless transmission technology or a second wireless transmission technology to exchange data between a first device and a second device,
wherein the selecting is based on one or more of: whether the first wireless transmission technology is supported by both of the first and second devices, a type of the data, a latency parameter associated with the data, a data rate parameter associated with the data, or an amount of the data;
causing the data to be exchanged between the first device and the second device using the selected one of the first wireless transmission technology or the second wireless transmission technology;
identifying the latency parameter associated with the data, wherein the selecting is based on the latency parameter associated with the data;
determining whether the latency parameter associated with the data exceeds a threshold latency condition;
selecting the first wireless transmission technology over the second wireless transmission technology to exchange the data between the first device and the second device when the latency parameter associated with the data does not exceed the threshold latency condition; and
selecting the second wireless transmission technology over the first wireless transmission technology to exchange the data between the first device and the second device when the latency parameter associated with the data exceeds the threshold latency condition.

20. The non-transitory machine-readable media of claim 19, wherein the first wireless transmission technology is Classic Bluetooth technology, and wherein the second wireless transmission technology is Bluetooth low energy (BLE) technology.

21. Non-transitory machine-readable media embodying program instructions adapted to be executed to implement a method for selecting a wireless transmission technology over which data is transferred between two devices, the method comprising:
selecting one of a first wireless transmission technology or a second wireless transmission technology to exchange data between a first device and a second device,
wherein the selecting is based on one or more of: whether the first wireless transmission technology is supported by both of the first and second devices, a type of the data, a latency parameter associated with the data, a data rate parameter associated with the data, or an amount of the data;
causing the data to be exchanged between the first device and the second device using the selected one of the first wireless transmission technology or the second wireless transmission technology;
identifying the data rate parameter associated with the data, wherein the selecting is based on the data rate parameter associated with the data;
determining whether the data rate parameter associated with the data exceeds a threshold data rate condition;
selecting the first wireless transmission technology over the second wireless transmission technology to exchange the data between the first device and the second device when the data rate parameter associated with the data exceeds the threshold data rate condition; and
selecting the second wireless transmission technology over the first wireless transmission technology to exchange the data between the first device and the second device when the data rate parameter associated with the data does not exceed the threshold data rate condition.

22. The non-transitory machine-readable media of claim 21, wherein the first wireless transmission technology is Classic Bluetooth technology, and wherein the second wireless transmission technology is Bluetooth low energy (BLE) technology.

23. Non-transitory machine-readable media embodying program instructions adapted to be executed to implement a method for selecting a wireless transmission technology over which data is transferred between two devices, the method comprising:
   selecting one of a first wireless transmission technology or a second wireless transmission technology to exchange data between a first device and a second device,
   wherein the selecting is based on one or more of: whether the first wireless transmission technology is supported by both of the first and second devices, a type of the data, a latency parameter associated with the data, a data rate parameter associated with the data, or an amount of the data;
   causing the data to be exchanged between the first device and the second device using the selected one of the first wireless transmission technology or the second wireless transmission technology;
   identifying the amount of the data, wherein the selecting is based on the amount of the data;
   determining whether the amount of the data exceeds a threshold amount of data;
   selecting the first wireless transmission technology over the second wireless transmission technology to exchange the data between the first device and the second device when the amount of the data exceeds the threshold amount of data; and
   selecting the second wireless transmission technology over the first wireless transmission technology to exchange the data between the first device and the second device when the amount of the data does not exceed the threshold amount of data.

24. The non-transitory machine-readable media of claim 23, wherein the first wireless transmission technology is Classic Bluetooth technology, and wherein the second wireless transmission technology is Bluetooth low energy (BLE) technology.

25. Non-transitory machine-readable media embodying program instructions adapted to be executed to implement a method for selecting a wireless transmission technology over which data is transferred between two devices, the method comprising:
   selecting one of a first wireless transmission technology or a second wireless transmission technology to exchange data between a first device and a second device,
   wherein the selecting is based on one or more of: whether the first wireless transmission technology is supported by both of the first and second devices, a type of the data, a latency parameter associated with the data, a data rate parameter associated with the data, or an amount of the data; and
   causing the data to be exchanged between the first device and the second device using the selected one of the first wireless transmission technology or the second wireless transmission technology,
   wherein the first wireless transmission technology is selected to exchange the data between the first device and the second device, and wherein the second wireless transmission technology is selected to exchange additional data between the first device and the second device.

26. The non-transitory machine-readable media of claim 25, wherein the second wireless transmission technology is selected to exchange the additional data based on one or more of a type of the additional data, a latency parameter associated with the additional data, a data rate parameter associated with the additional data, or an amount of the additional data.

27. The non-transitory machine-readable media of claim 25, the method comprising:
   causing the data to be transmitted using the first wireless transmission technology at the same time when the additional data is transmitted using the second wireless transmission technology.

28. Non-transitory machine-readable media embodying program instructions adapted to be executed to implement a method for selecting a wireless transmission technology over which data is transferred between two devices, the method comprising:
   selecting one of a first wireless transmission technology or a second wireless transmission technology to exchange data between a first device and a second device,
   wherein the selecting is based on one or more of: whether the first wireless transmission technology is supported by both of the first and second devices, a type of the data, a latency parameter associated with the data, a data rate parameter associated with the data, or an amount of the data;
   causing the data to be exchanged between the first device and the second device using the selected one of the first wireless transmission technology or the second wireless transmission technology;
   determining whether a hardware switch of the first device is in a first position or a second position;
   selecting the first wireless transmission technology when the hardware switch of the first device is in the first position; and
   selecting the second wireless transmission technology when the hardware switch of the first device is in the second position,
   wherein the first wireless transmission technology is Classic Bluetooth technology, and wherein the second wireless transmission technology is Bluetooth low energy (BLE) technology.

29. A system for selecting a wireless transmission technology over which data is transferred between two devices, the system comprising one or more devices to:
   select one of a first wireless transmission technology or a second wireless transmission technology to exchange data between a first device and a second device,
   wherein the selecting is based on one or more of: whether the first wireless transmission technology is supported by both of the first and second devices, a type of the data, a latency parameter associated with the data, a data rate parameter associated with the data, or an amount of the data;
   cause the data to be exchanged between the first device and the second device using the selected one of the first wireless transmission technology or the second wireless transmission technology;
   determine whether the first wireless transmission technology is supported by each of the first and second devices;
   select the first wireless transmission technology over the second wireless transmission technology to exchange the data between the first device and the second device when the first wireless transmission technology is supported by both of the first and second devices; and
   use the second wireless transmission technology to exchange the data between the first device and the second device only after determining that the first wireless transmission technology is not supported by at least one of the first and second devices.

30. The system of claim 29, wherein the first wireless transmission technology is Bluetooth low energy (BLE) technology, and wherein the second wireless transmission technology is Classic Bluetooth technology.

31. A system for selecting a wireless transmission technology over which data is transferred between two devices, the system comprising one or more devices to:
   select one of a first wireless transmission technology or a second wireless transmission technology to exchange data between a first device and a second device,
   wherein the selecting is based on one or more of: whether the first wireless transmission technology is supported by both of the first and second devices, a type of the data, a latency parameter associated with the data, a data rate parameter associated with the data, or an amount of the data;
   cause the data to be exchanged between the first device and the second device using the selected one of the first wireless transmission technology or the second wireless transmission technology;
   identify the type of the data, wherein the selecting is based on the type of the data;
   determine whether the type of the data is included among a first set of data types;
   select the first wireless transmission technology over the second wireless transmission technology to exchange the data between the first device and the second device when the type of the data is included among the first set of data types; and
   select the second wireless transmission technology over the first wireless transmission technology to exchange the data between the first device and the second device when the type of the data is not included among the first set of data types.

32. The system of claim 31, wherein the first set of data types include video, audio, and haptic data, and wherein the first wireless transmission technology is Classic Bluetooth technology, and wherein the second wireless transmission technology is Bluetooth low energy (BLE) technology.

33. A system for selecting a wireless transmission technology over which data is transferred between two devices, the system comprising one or more devices to:
   select one of a first wireless transmission technology or a second wireless transmission technology to exchange data between a first device and a second device,
   wherein the selecting is based on one or more of: whether the first wireless transmission technology is supported by both of the first and second devices, a type of the data, a latency parameter associated with the data, a data rate parameter associated with the data, or an amount of the data;
   cause the data to be exchanged between the first device and the second device using the selected one of the first wireless transmission technology or the second wireless transmission technology;
   identify the latency parameter associated with the data, wherein the selecting is based on the latency parameter associated with the data;
   determine whether the latency parameter associated with the data exceeds a threshold latency condition;
   select the first wireless transmission technology over the second wireless transmission technology to exchange the data between the first device and the second device when the latency parameter associated with the data does not exceed the threshold latency condition; and
   select the second wireless transmission technology over the first wireless transmission technology to exchange the data between the first device and the second device when the latency parameter associated with the data exceeds the threshold latency condition.

34. The system of claim 33, wherein the first wireless transmission technology is Classic Bluetooth technology, and wherein the second wireless transmission technology is Bluetooth low energy (BLE) technology.

35. A system for selecting a wireless transmission technology over which data is transferred between two devices, the system comprising one or more devices to:
   select one of a first wireless transmission technology or a second wireless transmission technology to exchange data between a first device and a second device,
   wherein the selecting is based on one or more of: whether the first wireless transmission technology is supported by both of the first and second devices, a type of the data, a latency parameter associated with the data, a data rate parameter associated with the data, or an amount of the data;
   cause the data to be exchanged between the first device and the second device using the selected one of the first wireless transmission technology or the second wireless transmission technology;
   identify the data rate parameter associated with the data, wherein the selecting is based on the data rate parameter associated with the data;
   determine whether the data rate parameter associated with the data exceeds a threshold data rate condition;
   select the first wireless transmission technology over the second wireless transmission technology to exchange the data between the first device and the second device when the data rate parameter associated with the data exceeds the threshold data rate condition; and
   select the second wireless transmission technology over the first wireless transmission technology to exchange the data between the first device and the second device when the data rate parameter associated with the data does not exceed the threshold data rate condition.

36. The system of claim 35, wherein the first wireless transmission technology is Classic Bluetooth technology, and wherein the second wireless transmission technology is Bluetooth low energy (BLE) technology.

37. A system for selecting a wireless transmission technology over which data is transferred between two devices, the system comprising one or more devices to:
   select one of a first wireless transmission technology or a second wireless transmission technology to exchange data between a first device and a second device,
   wherein the selecting is based on one or more of: whether the first wireless transmission technology is supported by both of the first and second devices, a type of the data, a latency parameter associated with the data, a data rate parameter associated with the data, or an amount of the data;
   cause the data to be exchanged between the first device and the second device using the selected one of the first wireless transmission technology or the second wireless transmission technology;
   identify the amount of the data, wherein the selecting is based on the amount of the data;
   determine whether the amount of the data exceeds a threshold amount of data;
   select the first wireless transmission technology over the second wireless transmission technology to exchange the data between the first device and the second device when the amount of the data exceeds the threshold amount of data; and select the second wireless transmission technology over the first wireless transmission technology to exchange the data between the first device and the second device when the amount of the data does not exceed the threshold amount of data.

38. The system of claim 37, wherein the first wireless transmission technology is Classic Bluetooth technology, and wherein the second wireless transmission technology is Bluetooth low energy (BLE) technology.

39. A system for selecting a wireless transmission technology over which data is transferred between two devices, the system comprising one or more devices to:
- select one of a first wireless transmission technology or a second wireless transmission technology to exchange data between a first device and a second device,
- wherein the selecting is based on one or more of: whether the first wireless transmission technology is supported by both of the first and second devices, a type of the data, a latency parameter associated with the data, a data rate parameter associated with the data, or an amount of the data; and
- cause the data to be exchanged between the first device and the second device using the selected one of the first wireless transmission technology or the second wireless transmission technology,
- wherein the first wireless transmission technology is selected to exchange the data between the first device and the second device, and wherein the second wireless transmission technology is selected to exchange additional data between the first device and the second device.

40. The system of claim 39, wherein the second wireless transmission technology is selected to exchange the additional data based on one or more of a type of the additional data, a latency parameter associated with the additional data, a data rate parameter associated with the additional data, or an amount of the additional data.

41. The system of claim 39, the system comprising the one or more devices to:
- cause the data to be transmitted using the first wireless transmission technology at the same time when the additional data is transmitted using the second wireless transmission technology.

42. A system for selecting a wireless transmission technology over which data is transferred between two devices, the system comprising one or more devices to:
- select one of a first wireless transmission technology or a second wireless transmission technology to exchange data between a first device and a second device,
- wherein the selecting is based on one or more of: whether the first wireless transmission technology is supported by both of the first and second devices, a type of the data, a latency parameter associated with the data, a data rate parameter associated with the data, or an amount of the data;
- cause the data to be exchanged between the first device and the second device using the selected one of the first wireless transmission technology or the second wireless transmission technology;
- determine whether a hardware switch of the first device is in a first position or a second position;
- select the first wireless transmission technology when the hardware switch of the first device is in the first position; and
- select the second wireless transmission technology when the hardware switch of the first device is in the second position,
- wherein the first wireless transmission technology is Classic Bluetooth technology, and wherein the second wireless transmission technology is Bluetooth low energy (BLE) technology.

* * * * *